M. O. SKOGSTAD & O. N. FINBRAATEN.
WEIGHING SCALE.
APPLICATION FILED FEB. 13, 1913.
1,126,108.
Patented Jan. 26, 1915.
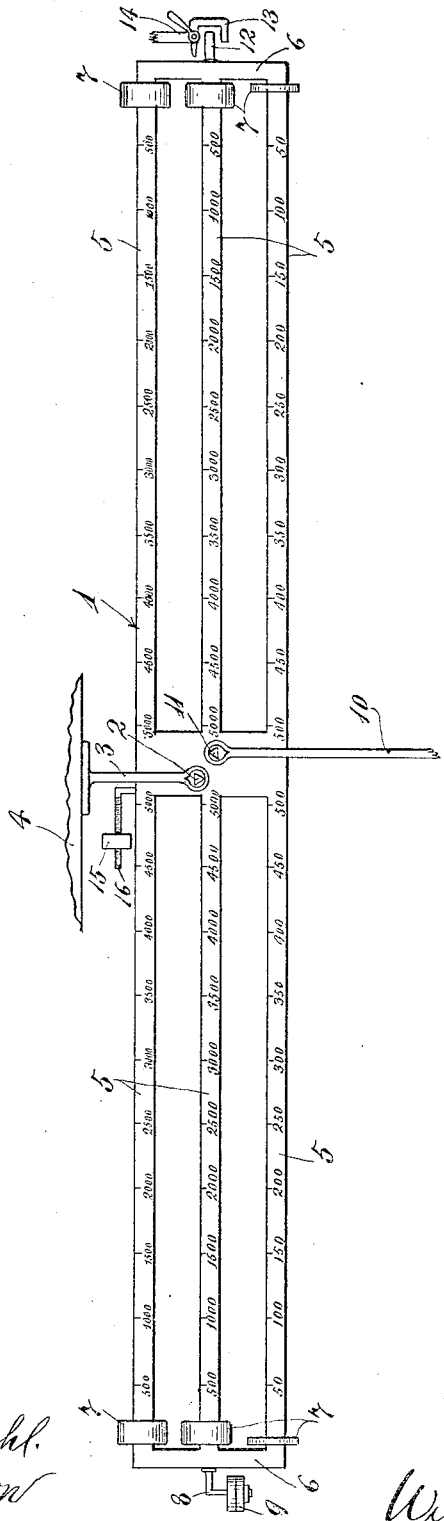
Witnesses.
A. H. Opsahl.
Geo. Knutson
Inventors.
Martin O. Skogstad.
Oscar N. Finbraaten.
By their Attorneys
Williamson & Merchant

UNITED STATES PATENT OFFICE.

MARTIN O. SKOGSTAD AND OSCAR N. FINBRAATEN, OF GRAND MEADOW, MINNESOTA.

WEIGHING-SCALE.

1,126,108. Specification of Letters Patent. Patented Jan. 26, 1915.

Application filed February 13, 1913. Serial No. 748,169.

*To all whom it may concern:*

Be it known that we, MARTIN O. SKOGSTAD and OSCAR N. FINBRAATEN, citizens of the United States, residing at Grand Meadow, in the county of Mower and State of Minnesota, have invented certain new and useful Improvements in Weighing-Scales; and we do hereby declare the following to be a full, clear, and exact description of the invention, such as will enable others skilled in the art to which it appertains to make and use the same.

Our invention relates to improvements in weighing scales and has for its object to improve the same in the several particulars hereinafter described and defined in the claim.

To ascertain the net weight of a loaded carrier on scales in common use, it is necessary to first weigh the loaded carrier to get the gross weight, then remove the load from the carrier, and weigh the empty carrier, to ascertain the tare weight. This last weight subtracted from the gross weight will give the net weight of the load. On the other hand, to secure the net weight of a load after the same is loaded into an empty carrier, it is necessary to first weigh the empty carrier, to secure the tare weight. This amount is then added to the desired net weight of the load, the scales set accordingly, and a sufficient load placed in the carrier to balance the scale. Obviously, in this use of the ordinary scales, there is always danger of making a mistake in addition or subtraction.

In our invention, we provide an intermediately fulcrumed scale beam and coöperating counter weights movably mounted thereon, by the use of which finding the net weight of a commodity in a carrier is greatly simplified and facilitated, as the necessary addition and subtraction are computed on the scale beam during the process of weighing the load.

The invention is illustrated in the single view in elevation of the drawing.

The scale beam 1 is intermediately fulcrumed at 2 to a depending bracket 3, secured to a beam box 4. The scale beam 1 on each side of the fulcrum is made up of three horizontally extended bars 5. Corresponding bars 5 on opposite sides of the fulcrum 2 are alined and the said bars are connected at their inner and outer ends by cross tie bars 6.

The alined bars 5 on opposite sides of the fulcrum 6 have marked thereon counter graduations, to indicate pounds and the said graduations increase in denominations from the outer ends of said bars 5 toward the fulcrum 2. The upper and intermediate bars 5 are graduated from zero up to five thousand pounds, and the lower bars 5 are graduated from zero up to five hundred pounds.

Slidably mounted on each bar 5 is a counter weight 7.

To the left hand end of the scale beam 1 is secured a bent hanger rod 8, adapted to receive and hold one or more supplemental weights 9, the purpose of which will presently appear. The connecting rod 10 between the scale platform and the scale beam is fulcrumed at 11 to the intermediate portion of the scale beam and said fulcrum is located slightly below and to one side of the fulcrum 2.

For positively holding the beam 1 balanced or in a normal position, the same is provided with a horizontally projecting finger 12, arranged to be engaged and held by a pivoted hook-like latch 13, pivotally secured to a support 14. An adjusting weight 15 is provided for keeping the scale beam in a perfectly balanced position. This weight 15 has screw threaded engagement with a horizontally extended rod 16, vertically spaced above the scale beam 1 and having one of its ends bent laterally downward and rigidly secured thereto, at the left of both of the fulcrums 2 and 11.

To balance the scale beam, or to put the scale in its normal position, all of the counter weights 7 are moved to the outer ends of the bars 5 of the scale beam 1. To secure the gross weight of a commodity and its carrier, the same are placed on the scale platform, not shown. Under the weight of the load on the scale platform, the right hand end of the scale beam 1 will be pulled down by the connecting rod 10. One or more of the counter weights 7 on the end of the scale beam 1 which is down is moved toward the pivotal support of said beam, until the same is again balanced. The reading of the scale will give the gross weight of the load. After the commodity within the carrier is removed therefrom, the left hand end of the scale will be pulled down, and the net weight of the commodity may be obtained by moving one or more of the counter weights 7 on the left hand end of the beam inward or toward the fulcrum 2 of said scale beam 1 until the beam is again balanced, the first weight used remaining in place to indicated the gross weight. The reading of the scale at the left hand end of the beam will give the net weight of the load. Obviously, the difference between the readings on the two ends of the scale beams will give the tare weight.

To secure the net weight of the load wherein the carrier is first weighed empty and then the commodity placed therein, the carrier is first placed on the platform, at which time the right hand end of the scale beam 1 will be pulled down. Then, by moving the weight on the top bar 5 at the right hand end of the scale beam 1 inward until the said beam is again balanced, the weight of the carrier or the tare weight may be obtained. After this is done, the commodity is placed within the carrier, which will again pull down the right hand end of the beam 1. The weight 7 indicating the tare weight remaining in place, one or both of the two remaining counter weights 7 on the bars 5 at the right hand end of the scale beam 1 may now be moved toward the fulcrum 2 until the scale beam 1 is again balanced. This last reading on the scale will give the net weight of the commodity. Providing the weight of a carrier is greater than the amount indicated on the top bar 5 at the right end of the scale beam 1, it will be necessary to use in connection with the weights 7 of the bar 5 one or more of the supplemental weights 9.

The above described device, while extremely simple, is thought to be highly efficient for the purpose had in view.

What we claim is:

An intermediately pivoted scale beam having a plurality of bars on each side of its fulcrum, the alined bars on opposite sides of the beam fulcrum having counter graduations, and counter weights slidably mounted on the said graduated bars, the said graduations on said bars increasing from the outer ends toward the beam fulcrum.

In testimony whereof we affix our signatures in presence of two witnesses.

MARTIN O. SKOGSTAD.
OSCAR N. FINBRAATEN.

Witnesses:
E. F. GREENING,
P. T. ELLIOTT.

Copies of this patent may be obtained for five cents each, by addressing the "Commissioner of Patents, Washington, D. C."